(12) United States Patent
Lautenschlager

(10) Patent No.: US 6,242,723 B1
(45) Date of Patent: Jun. 5, 2001

(54) APPARATUS FOR PERFORMING CHEMICAL AND PHYSICAL PROCESSES WITHOUT SAMPLE TRANSFER WITHIN A MICROWAVE RADIATION FIELD

(75) Inventor: Werner Lautenschlager, Leutkirch (DE)

(73) Assignee: Milestone s.r.l., Sorisole (IT)

( * ) Notice: Subject to any disclaimer, the term of this patent is extended or adjusted under 35 U.S.C. 154(b) by 0 days.

(21) Appl. No.: 09/362,697

(22) Filed: Jul. 29, 1999

Related U.S. Application Data
(60) Provisional application No. 60/095,136, filed on Jul. 30, 1998.

(51) Int. Cl.[7] ....................................................... H05B 6/80
(52) U.S. Cl. ........................ 219/679; 219/686; 219/687; 219/762; 422/21; 436/137; 210/295
(58) Field of Search ..................................... 219/686, 679, 219/687, 688, 762, 735, 756, 757; 422/68.1, 78, 21; 202/124, 137; 436/137; 210/295

(56) References Cited

PUBLICATIONS

International Eastern European–American Symposium of Chromatography, Akademiai Kiado, Budapest, (1984), "A New Method for the Extraction and High–Performance Liquid Chromatographic Determination of Vicine and Convicine in Fababeams", Ganzler et al., (pp. 435–442), H. Kalasz, L.S. Etre.

Journal of Chromatography, 1, (1986), "Microwave Extraction—A Novel Sample Preparation Method for Chromatography", Ganzler al el. (pp. 299–360), Elsevier Science Publishers B.V.

Z. Lebensm Unters Forsch, 184, (1987), "Microwave–extraction—a new method superseding traditional Soxhet extraction", Ganzler et al., (pp. 274–276), Springer–Verlag 1987.

Primary Examiner—Philip H. Leung
(74) Attorney, Agent, or Firm—Lacasse & Associates

(57) ABSTRACT

Disclosed is an apparatus for use within a microwave radiation field which enables the operator to perform successively a plurality of chemical or physical processes while the apparatus remains in the microwave cavity. The apparatus according to the invention can be used to perform a total microwave solvent extraction including the steps of drying, extraction, filtration, and concentration. Other examples of processes, which are carried out with this apparatus are digestions, hydrolyses, separations, agitations, and precipitations. The apparatus is constructed from a container having an inside vessel. The container and the inside vessel have a substantially closed volume there between. The container and the inside vessel are in fluid communication through a glass fiber filter disposed at approximately the bottom of the inside vessel. The container and the inside vessel are in fluid communication with a plurality of inlet and outlet ports, which provide or receive fluids to or from the inside vessel or the volume between the container and the inside vessel. The ports are also used to increase or decrease the fluid communication between the container and the inside vessel through the filter disposed near the bottom of the inside vessel. The glass fiber filter is removable from the inside vessel and can be replaced with a new one.

21 Claims, 3 Drawing Sheets

APPARATUS FOR PERFORMING CHEMICAL AND PHYSICAL PROCESSES WITHOUT SAMPLE TRANSFER WITHIN A MICROWAVE RADIATION FIELD

This application claims priority from the provisional U.S. patent application Ser. No: 60/095,136 filed on Jul. 30, 1998.

FIELD OF THE INVENTION

This invention generally relates to the application of microwave heated reaction systems for performing chemical and physical processes within a microwave radiation field. More particularly the invention relates to an apparatus permitting a plurality of different chemical and physical processes without sample transfer.

BACKGROUND OF THE INVENTION

At present, analytical laboratories are faced with the annoying contrast between long sample preparation times and very rapid analysis of the samples. State of the art analytical instruments must wait, and often sit idle for long periods of time, for samples to be prepared by methods using old technologies. The productivity of analytical laboratories can be improved either by increasing the performance of analytical instruments or by reducing sample preparation times. Therefore, sample preparation time has become the rate-limiting factor to higher productivity in modern laboratories.

A classic sample preparation technique requires that one or more components of a sample is selectively solubilized and separated from bulk samples prior to analysis. The time required to perform such traditional separations, known as extractions, is a function of the type of solvent and the solubility of the species to be extracted at the extraction temperature.

In an open vessel, the highest extraction temperature is the boiling point of the solvent system, at atmospheric pressure. When extractions are performed in a closed vessel system, it is possible to increase the extraction temperature. As is well known, an increase in pressure of a closed vessel system results in an increase of the boiling point of the solvent system. Increasing the extraction temperature can have the effect of dramatically increasing the solubility of the extractant species, thereby increasing the efficiency of the extraction process and reducing the time needed for the extraction process.

Microwave induced heating of solvent extractions for analytical sample preparations has been known since the mid-nineteen eighties. Ganzler et al., described "A new method for the extraction and high-performance liquid chromatographic determination of vicine and convicine in fababeans", Chromatography, the State of the Art, Akademiai Kiado, Budapest, (1985) pp. 435–442, which was presented at the 2nd International Eastern European-American Symposium of Chromatography in 1984. In 1986, Ganzler et al., also reported microwave extraction as a novel sample preparation method for chromatography in the Journal of Chromatography, 1, pp. 299–306. Further reports by Ganzler and Salgo for the use of microwave energy to heat an extractant medium are found in Z. Lebensm. Unters. Forsch., 184, pp. 274–276, 1987. However, most of the microwave energy is absorbed by the extracting solvent resulting in heating of the extracting solvent but very little energy reaches the inner parts of the material to be extracted.

In U.S. Pat. No. 5,002,784, ParJ teaches that biological materials containing microwave absorbing substances, which are subjected to microwave radiation while in contact with a microwave transparent or partially transparent extracting solvent, result in differential heating of the material to be extracted. ParJ also discloses in U.S. Pat. No. 5,732,476 a method for microwave-assisted separation using volatiles, which are carried out in a flow-through system having a microwave absorbing component.

Thus far the microwave heating has relied on the presence of polar, microwave absorbing solvents and on mixtures of polar and non-polar solvents. The recoveries achieved with the use of microwave-assisted extraction processes are comparable or superior to traditional soxhlet extractions but the extraction rates are significantly faster.

A new Milestone, Inc.® technique allows microwave extractions using polar as well as non-polar solvents, while agitating the sample and solvent to achieve mixing and optimum recoveries. Pure, non-polar solvents can be heated by using Weflon® coated magnetic stir bars that absorb microwave energy and, in turn, heat non-polar, microwave-transparent solvents. Thus, microwave extractions can be performed without the addition of polar co-solvents.

In view of the fact that sample preparation time has become the rate-limiting factor preventing higher productivity in an analytical laboratory, it is an objective of this invention to provide a vessel and a system, which assures fast operation. This is achieved by employing a vessel and a system that is usable for a plurality of chemical or physical processes, such as drying, extraction, filtration, as well as for solvent evaporation and recovery without the need of transferring the sample to another vessel. The fact that a multitude of reactions and processes can be performed in the same vessel and with the same system provides for cost effective and fast operation. Another object of this invention is to provide a vessel and a system facilitating even heating of the sample to avoid so called "hot spots".

SUMMARY OF THE INVENTION

It is an object of the present invention to provide an apparatus for performing a chemical or physical process with a sample within a field of microwave radiation comprising a container having a second container therewithin, the container and the second container defining a volume therebetween and the second container having a containing portion, said second container having a filter for filtering; at least a first inlet port and a second inlet port, the first inlet port in communication with the volume and the second inlet port in communication with the containing portion for providing fluids to the volume and the containing portion, respectively; and at least a first and a second outlet port, the first outlet port in communication with the volume and the second outlet port in communication with the containing portion for receiving fluids from the volume and the containing portion, respectively.

In accordance with the invention, there is provided a method for performing a plurality of chemical and physical processes within a microwave radiation field comprising the steps of providing a first container; providing a second container in fluid communication with the first container; providing a filter for preventing some fluid communication between the first and second containers, the filter between the first and second containers is disposed along a path of fluid communication therebetween; and, providing pressure control to at least one of the first and second containers so as to increase or decrease fluid communication between the first container and the second container.

BRIEF DESCRIPTION OF THE DRAWINGS

Exemplary embodiments of the invention will now be described in accordance with the drawings in which.

Similar references are used in different figures to denote similar components.

DETAILED DESCRIPTION OF THE INVENTION

Figure 1:
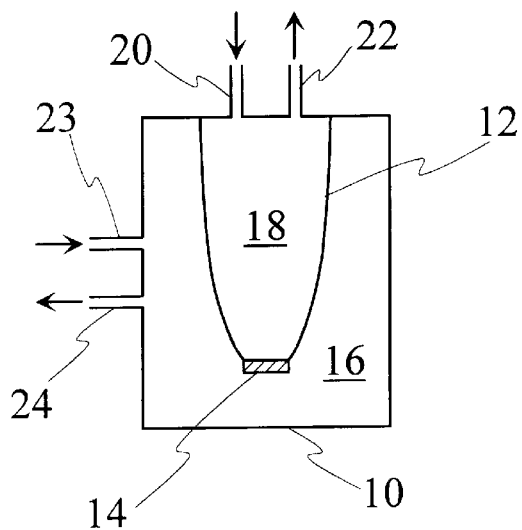
FIG. 1 is a sectional view of a multiple-port version of the apparatus for performing successively a plurality of physical or chemical processes in the same apparatus within a microwave cavity.

Referring to FIG. 1 there is illustrated a sectional view of an embodiment of the apparatus for performing successively a plurality of chemical and physical processes within a microwave cavity without the need for sample transfer. According to the invention the apparatus comprises a container 10 having a second container 12 therewithin. The container 10 and the second container 12 are made of a chemically resistant material, such as engineering plastic, Teflon, quartz or glass, depending on experimental requirements. The container 10 can be adapted to assist the heating of non-polar microwave-transparent solvents by reinforcing it with microwave-absorbing material in the form of Weflon®. The container 10 and the second container 12 define a volume 16 therebetween. Volume 16 is in fluid communication with the first inlet port 23 and the first outlet port 24 located on the wall of container 10. The second container 12 is a filtering device for preventing the passage of fluids therethrough in one mode of operation and for regulating the passage of fluids therethrough in another mode of operation, and has a containing portion 18 and a filter 14. As shown in FIG. 1, filter 14 is removably disposed at the bottom of the second container 12. Filter 14 is pressed into a predetermined shape to fit the bottom of the second container 12 and to withstand the substantial pressure differential necessary for passing fluids through the filter 14. In accordance with this invention, filter 14 is made preferably from packed glass fibers, such as borosilicate fibers, pyrex fibers, quartz fibers or others, depending on the requirements for chemical inertness. Pressed glass fibers provide a reasonably economical filter material, which justifies the use of this filter as a disposable filter.

The containing portion 18 of the second container 12 is in fluid communication with the second inlet port 20 and the second outlet port 22. The second inlet port 20 and the second outlet port 22 are disposed on the lid to seal both container 10 and the second container 12. Therefore, the volume 16 and the containing portion 18 are both a substantially closed region and the pressure inside the apparatus is regulated through the two inlet and outlet ports. The containing portion 18 of the second container 12 and the volume 16 between the container 10 and the second container 12 are in fluid communication through the filter 14 disposed therebetween.

Figure 2:
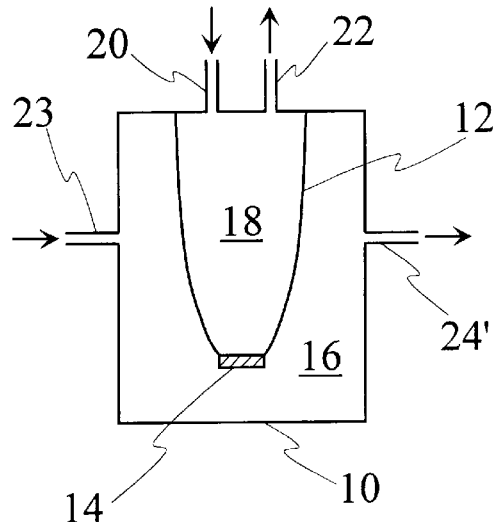
FIG. 2 shows a modification of the apparatus shown in FIG. 1 in which the first outlet port is spaced from the first inlet port.

FIG. 2 depicts a modification of the embodiment shown in FIG. 1, wherein the first inlet port 23 is spaced apart from the first outlet port 24. Hence the first outlet port in FIG. 2 is denoted 24' to indicate a different placement of the port on the wall of the container 10.

Figure 3:
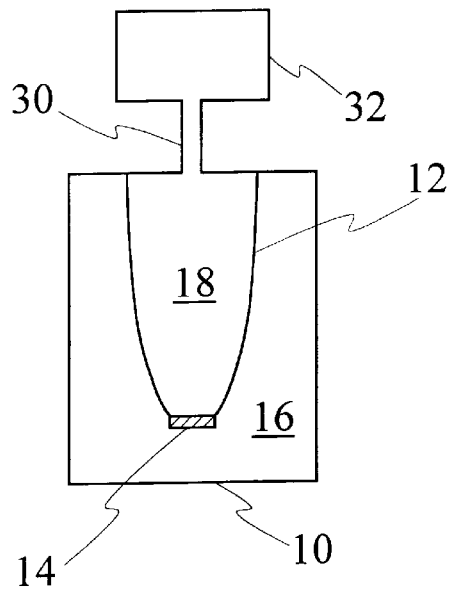
FIG. 3 is a sectional view of a single-port version of the apparatus according to the invention.

FIG. 3 shows a third embodiment of the invention, which is a single port version of the first two embodiments. The apparatus comprises a container 10 having a second container 12 therewithin. The second container 12 is also referred to as the inside vessel or the insert in this specification. The container 10 and the second container 12 define a volume 16 therebetween. The second container has a containing portion 18 and a filter 14 disposed at the bottom thereof. The containing portion 18 is in fluid communication with a port 30. The port 30 is connected to a pressure control device 32. This pressure control device 32 enables port 30 to be operated in two modes, i.e. in one mode of operation port 30 is used as an inlet port and in a second mode of operation port 30 is used as an outlet port.

Figure 4:
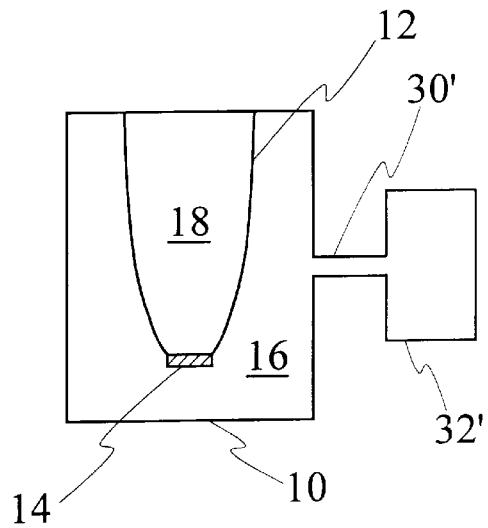
FIG. 4 is a sectional view of another single-port version of the apparatus according to the invention.

FIG. 4 depicts a fourth embodiment of the invention, which is a single port version of the first and second embodiments. In this embodiment the port 30' is in fluid communication with the volume 16 between the container 10 and the second container 12. The port 30' is connected to a pressure control device 32'. This pressure control device 32' enables port 30' to be operated in two modes, i.e. in one mode of operation port 30' is used as an inlet port and in a second mode of operation port 30' is used as an outlet port.

Figure 5:
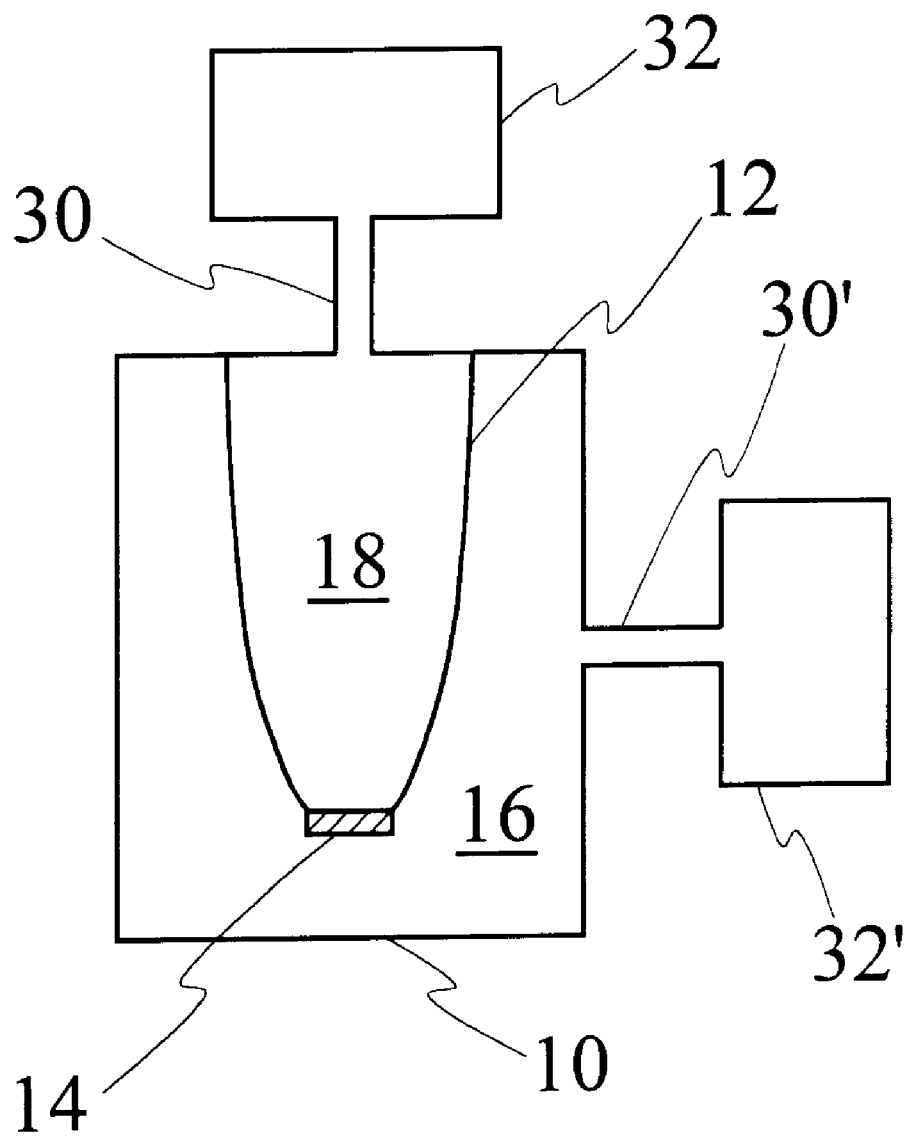
FIG. 5 is a sectional view of a two-port version of the apparatus according to the invention; and, FIG. 6 is an isometric view of the apparatus showing that the second container/vessel having a filter at approximately its bottom is removable from the container and made to fit a base.

FIG. 5 presents a fifth embodiment of the invention and is a combination of the two single port versions shown in FIGS. 3 and 4. The apparatus according to the invention has two ports and both of them can be operated in two modes. Port 30 is in fluid communication with the containing portion 18 and the pressure control device 32. The pressure control device 32 allows operation of the port 30 as an inlet port in one mode and as an outlet port in a second mode. Port 30' is in fluid communication with the volume 16 and the pressure control device 32'. The pressure control device 32' allows operation of the port 30' as an inlet port in one mode and as an outlet port in a second mode.

Figure 6:
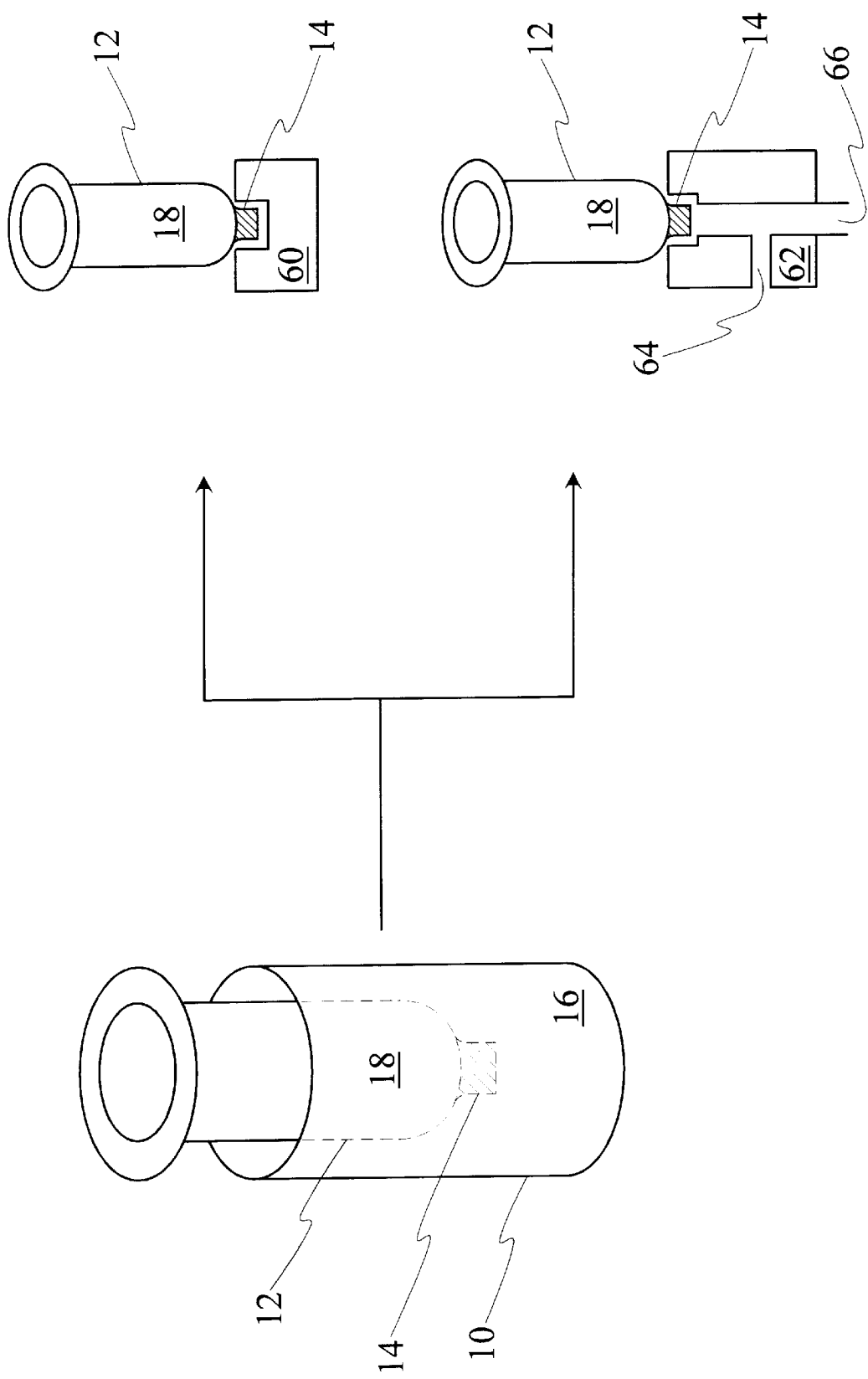

FIG. 6 is an isometric view of the apparatus showing an additional feature of the invention wherein the second container/inside vessel 12 is removable from the container 10. When desired, the second container/inside vessel 12 having a glass fiber filter 14 at its bottom is removed from the container 10 and placed in a base 60 or 62. The second container/inside vessel 12 having a filter 14 at the bottom is made to be fitted with a base, which effectively closes the bottom of the vessel 12. Base 60, for example, represents a scale, a rotor, or a centrifuge that receives the vessel 12 and prevents the passage of fluids through the filter bottom 14. Base 62 is further adapted to draw a vacuum against the vessel 12 through the vacuum line 64. The application of a vacuum permits the passage of fluids from the containing portion 18 to the fluid-passageway 66 through the filter 14. This permits, when desired, filtration of fluids outside the microwave radiation field.

In the construction shown in FIG. 1 the apparatus according to the invention is used to perform, successively, a plurality of chemical or physical processes all in the same apparatus without the need to transfer the sample to another vessel for the next step. Therefore, a total microwave solvent extraction, including the steps of drying, extraction, and filtration, is carried out without sample transfer. Other examples of chemical or physical processes which can be performed with the apparatus according to the present invention include agitation of the sample, derivatization, hydrolysis, esterification, concentration/evaporation, solvent recovery, and separation, all in the same apparatus. The use of the same apparatus for a plurality of sequential processes affords significant time savings. Of course, numerous other processes may be realized with this apparatus without departing from the inventive aspect of this apparatus.

The sample of interest is placed in the containing portion 18 of the second container 12 and the apparatus is sealed to the external environment. Then, the apparatus is placed on a turntable inside a microwave cavity. The turntable is capable of accommodating a plurality of apparatuses in the form of vessels, according to the present invention. When microwave radiation is applied to the microwave cavity, the sample inside the apparatus heats up if a polar solvent is present.

It is also possible to heat pure, non-polar solvents to elevated temperatures at low levels of microwave power with this system by using magnetic stir bars made of Weflon®. Furthermore, the use of apparatuses or lids or other components for the apparatuses having a Weflon® reinforcement will also aid the heating of non-polar microwave-transparent solvents. Weflon® is a Milestone® proprietary fluoropolymer. This chemically inert fluoropolymer absorbs microwave energy, heating non-polar microwave-transparent solvents by direct contact with the microwave heated weflon, allowing microwave extraction procedures to be performed without addition of polar co-solvents. Alternatively, the entire apparatus is formed of Weflon or a portion of the apparatus is formed of Weflon, the portion other than a reinforcing portion. For example, when the ring surrounding the filter is formed of Weflon and the filter is disposed near a bottom of the container, the ring will provide heat to the contents of the container. The use of Weflon integral to the containers results in reduced number of components, improved heating and heat distribution, and may serve other valuable functions. For example, using a weflon cover prevents condensation on the container cover.

In an extraction process, solid samples are often dried before the actual extraction step is carried out, in order to avoid excess moisture. The presence of excess moisture sometimes slows down the extraction process, since water in the sample absorbs microwave energy. Starting with dry samples assures that all samples are processed in a similar fashion.

A sample is weighed and placed in the containing portion of the second container 12. The special glass fiber filter 14 at the bottom of the second container retains the sample in the container. The second container/inside vessel is then placed inside container 10 and the entire apparatus is closed with a lid, for example, in order to make volume 16 and the containing portion a substantially closed region. The apparatus is positioned on a turntable in a microwave cavity and the drying procedure is started by applying microwave radiation to the apparatus. The outlet ports 22 and 24 are ports for optionally creating a vacuum inside the apparatus. Optionally, either one of the ports is used as port 22 is in fluid communication with the containing portion 18 and port 24 is in fluid communication with the volume 16. Furthermore, the volume 16 and the containing portion 18 are also in fluid communication through the filter 14. Drying in a vacuum lowers the evaporation temperature and hence reduces the drying time and also preserves thermally unstable samples. In order to achieve even better drying it is preferable to use outlet port 22 to evacuate the apparatus, close outlet port 24, and provide a moderate gas flow, such as air flow or inert gases, through the inlet port 23. This produces a gas flow through and around the sample. This gas flow acts as a vehicle for carrying moisture out of the sample when passing therethrough, causing the sample to dry more effectively and faster than with a conventional microwave drying apparatus.

After the sample is dried, a suitable solvent is added to the sample via the inlet port 20 and then both the inlet port 20 and the outlet port 22 are closed for the extraction step. As explained above, both polar and non-polar solvents can be used in the extraction step. Weflon® stir bars or Weflon® reinforced apparatus components absorb microwave energy and heat the non-polar solvent. Thus, when desired, the same solvents used for a soxhlet extraction are used with this method. Heating fluids within a closed apparatus causes the pressure to increase as the vapor phase is developing. The pressure inside the apparatus is controlled through the outlet port 22. As the pressure increases in a closed vessel/apparatus system the boiling point of the solvent increases correspondingly. A sample is boiling when its vapor pressure is equal to or very slightly greater than the pressure above the liquid in the surrounding environment. Therefore, if the pressure is increased inside the apparatus, the boiling point of the solvent increases accordingly. This enables the operator to control the boiling point of a solvent through pressure control in the apparatus. Thus, the extraction time is significantly reduced by using increased extraction temperatures as a result of an increased boiling point of the solvent system under pressure.

After the extraction step is completed, filtration of the extractant containing the solvent is performed in the same apparatus without having to open it. The filter 14, a glass fiber plug, is positioned preferably at the bottom of the second container 12. In order to separate solid particles from fluids through filter 14 a significant pressure differential is applied between the containing portion 18 and the volume 16. This is achieved by supplying a gas, such as air or an inert gas, to the apparatus through inlet port 20 or by evacuating the apparatus through outlet port 24. Alternatively, the second container is removed and inserted onto a vacuum apparatus for drawing liquid from the second container through the filter 14.

The glass fiber filter 14 according to the invention is pressed into a predetermined shape and according to the manufacturing conditions different filters 14 are prepared for a range of different pressure differentials according to the required experimental conditions. For example, when a certain solvent is used in an extraction step, which requires a relatively high extraction temperature, the pressure inside the apparatus is increasing correspondingly. However, the filter has to be able to retain the solvent in the containing portion 18 during the extraction step without letting the solvent pass through to the volume 16. For this reason it is required that filter 14 not permit the passage of fluids at the operating pressure of the apparatus. Alternatively, the pressure is maintained equal in both volumes by allowing fluid communication therebetween. Another possibility of preventing the passage of fluids between the containing portion 18 and the volume 16 is provided by supplying an inert gas to volume 16 through the inlet port 23 in order to maintain substantially similar pressures in volume 16 and containing portion 18. This reduces the pressure differential between the containing portion 18 and volume 16 and hence the fluids are maintained in the containing portion 18 and are not pressed through the filter 14 to the volume 16.

Filter 14 is made of glass fiber and pressed into a certain shape to be fitted in the second container 12. The glass fibers used to prepare the filter plug are any glass fibers suitable for high temperatures or at least suitable for the operating temperature to which the apparatus is exposed; examples of such glass fibers are quartz fiber, borosilicate fiber, and pyrex fiber. Preferably the fibers selected have a low microwave cross-section. After the experiment is finished, the filter 14 is removed from the second container 12 and discarded. This presents a significant advantage to conventional frit filters. Glass fiber filters are inexpensive and therefore disposable. Conventional frit filters are fused to a certain porosity and are relatively expensive. Further, they are often difficult to clean. The high cost of frit filters discourages disposing of them after a single use and hence frit filters must be cleaned for each subsequent experiment. Thus a pressed glass fiber filter allows for an overall shorter experimentation time as the low equipment costs provide for a disposable filter.

The possibility of filtration in a microwave cavity with this apparatus presents another advantage because it enables the application and control of heat during the filtration step. Furthermore, if heat is not a critical factor for the filtration step it is still advantageous to be able to use the closed vessel filtration system as the sample is filtered instantly without having to wait for the sample to cool down to be handled safely.

The filtrate is collected in the volume 16 and a variety of further processing steps are available depending on the objective of the experimenter. For example, the filtrate is concentrated to dryness for gravimetric determinations or to the required volume for gas chromatography, gas chromatography/mass spectrometry, or high pressure liquid chromatography by removing the solvent through the outlet port 24.

The remaining solid particles in the containing portion 18 are washed by supplying fresh solvent through the inlet port 20 and agitating the sample in the fresh solvent and then filtering the solvent as described above. Agitation is achieved by spinning the magnetic stir bar or, alternatively, by bubbling an inert gas through the filter. This inert gas is supplied through inlet port 23 to the volume 16 and since volume 16 is in fluid communication with the containing portion 18 the gas bubbles up through the filter 14. However, it is necessary to control the pressure build-up inside the apparatus and the inert gas is then removed through outlet port 22 to avoid an excess pressure build-up. Alternatively, when the apparatus is designed for high pressure operation and is provided with pressure related safety features, pressure control is less critical.

The possibility of bubbling an inert gas through the sample as described above is advantageous when heating a sample in an extraction or digestion step as the system does not rely solely on convection.

When desired, after a solvent extraction is complete, the solid sample left in the containing portion 18 is digested for further elemental analysis by means of inductively coupled plasma, inductively coupled plasma/mass spectrometry, atomic absorption spectrometry, or atomic emission spectrometry, for example. The necessary chemicals for the digestion step are supplied gradually to the containing portion 18 through the inlet port 20. The sample is then heated to the desired temperature and pressure using microwave radiation while all inlet ports 20, 23 and outlet ports 22, 24 are closed.

When, only part of the sample is digested a filtration step, as described above, is carried out and the filtrate is collected for further analysis by removing it from the volume 16 through outlet port 24. Another digestion step may then be performed by gradually supplying the necessary chemicals to the solid sample maintained in the containing portion 18 through the inlet port 20.

In the same way as an extraction and/or digestion step is performed, the apparatus is used to carry out derivatization reactions, such as the formation of methyl esters, by taking the fluids or the solid and adding the corresponding chemicals through the appropriate inlet ports 20 or 23. Furthermore, hydrolysis is possible because of a gas flow, such as water vapors, hydrochloric acid or ammonia, through volume 16. The gas is supplied to the volume 16 through the inlet port 23 and removed from the volume 16 through the outlet port 24. However, in some instances it is advantageous to space the ports apart as in agreement with the second embodiment of this invention shown in FIG. 2, where the inlet port 23 and the outlet port 24' are spaced apart to yield some distance between them. When a gas flow from inlet port 23 to outlet port 24' is applied, a better circulation of the gas in the volume 16 results. A better circulation of the gas is desired, for example, when drying or hydrolyzing samples in the apparatus according to the invention.

The use of an apparatus for a plurality of physical and chemical processes, such as drying, solvent extraction, concentration, solvent recovery, digestion, hydrolysis, derivatization, speeds the sample preparation for further chemical analysis and, thus, makes it much more effective. Since all these processes are carried out in the same vessel, sample losses are avoided in addition to the already mentioned advantages.

The apparatus according to the invention is also advantageous when precipitating a part of the sample in the containing portion 18 and then separating it by filtering off the fluid through the filter 14. The precipitate is removed from the containing portion or further processed by dissolving it upon addition of appropriate chemicals through the inlet port 20.

The filter 14 as part of the two-vessel system is used for separating two powders, one powder in the containing portion 18 of the second container 12 and one powder in the volume 16 between the container 10 and the second container 12.

The third and the fourth embodiment in agreement with this invention are presented in FIGS. 3 and 4, respectively. These embodiments represent single-port versions of the apparatus described above and are operated in much the same way. Port 30 in FIG. 3 is in fluid communication with the containing portion 18 of the inside vessel/second container 12 and a pressure control device 32. Port 30' in FIG. 4 is in fluid communication with the volume 16 between the container 10 and the inside vessel/second container 12 and a pressure control device 32'. The pressure control devices 32 and 32' are used to operate the ports 30 and 30', respectively, in two modes, i.e. in one mode of operation ports 30 and 30' function as an inlet port to provide fluids and in another mode of operation ports 30 and 30' function as an outlet port to receive fluids.

FIG. 5 is a sectional view of the fifth embodiment according to the invention and presents a two-port version of the apparatus. This two-port version is essentially a combination of the single-port versions presented in FIGS. 3 and 4 and provides for more versatility in the use of the apparatus as in comparison to the single-port version. Both ports, 30 and 30', are operated as an inlet port in one mode of operation and as an outlet port in another mode of operation controlled by a pressure control device.

Of course, many advantages exist to the inner vessel itself. The inner vessel comprising a vessel having an opening at the bottom thereof for accommodating a glass fiber filter provides for numerous functions. Insertion of the vessel into a pressure sleeve having a plug for stopping the opening at the bottom of the vessel, allows for processing of chemicals within the vessel at high temperatures and pressures. Upon removing the vessel from the sleeve, the chemicals are filterable through the glass fiber filter without having to pour off the chemicals into a filtration vessel. Further, disposing of the filter and washing the vessel is a relatively simple task. The vessel is also useful in drying operations (as noted above) and in other chemical processes. This flexibility is advantageous because it eliminates a need for numerous different specialized vessels thereby saving space, money, and adding convenience.

Numerous modifications, variations, and adaptations may be made to the particular embodiments of the invention described above without departing from the scope and spirit of the invention, which is defined in the claims.

What is claimed is:

1. An apparatus for performing a chemical or physical process with a sample within a field of microwave radiation comprising:
   (a) a first container having a second container therewithin, the container and the second container defining a volume therebetween and the second container having a containing portion, said second container having a filter disposed between the second container and the first container and for filtering fluid passing from one of the first container and the second container to the other of the first and second containers;
   (b) at least a first inlet port and a second inlet port, the first inlet port in communication with the volume and the second inlet port in communication with the containing portion for providing fluids to the volume and the containing portion, respectively; and
   (c) at least a first and a second outlet port, the first outlet port in communication with the volume and the second outlet port in communication with the containing portion for receiving fluids from the volume and the containing portion, respectively.

2. An apparatus as defined in claim 1, wherein the volume is a substantially closed region between the first container and the second container.

3. An apparatus as defined in claim 1, wherein the containing portion of the second container is a substantially closed region.

4. An apparatus as defined in claim 1, wherein the inlet and the outlet ports are in fluid communication with the volume and the containing portion through the filter.

5. An apparatus as defined in claim 1, wherein the second container is removable from the first container.

6. An apparatus as defined in claim 1, wherein the first container and the second container are integral.

7. An apparatus as defined in claim 1, wherein the filter is removably disposed at approximately the bottom of the second container.

8. An apparatus as defined in claim 1, wherein the filter is comprised substantially of glass fiber.

9. An apparatus as defined in claim 1, wherein the filter is for maintaining at least a portion of the sample in the containing portion of the second container.

10. A method for performing a plurality of chemical and physical processes within a microwave radiation field comprising the steps of:
    (a) providing a first container;
    (b) providing a second container in fluid communication with the first container;
    (c) providing a filter for preventing some fluid communication between the first and second containers, the filter between the first and second containers is disposed along a path of fluid communication therebetween; and,
    (d) providing pressure control to at least one of the first and second containers so as to increase or decrease fluid communication between the first container and the second container.

11. A method as defined in claim 10, wherein the filter is made substantially of glass fiber.

12. An apparatus for performing a chemical or physical process with a sample within a microwave radiation field comprising:
    (a) a container having an inside vessel, the container and the inside vessel having a substantially closed volume therebetween, the inside vessel having a filter for filtering at least a portion of the sample; and
    (b) at least one port in fluid communication with one of the volume and the container; the port being connected to a pressure control device, the pressure control device for enabling the port for evacuating at least one of the volume and the inside vessel in one mode of operation and for providing fluids to at least one of the volume and the inside vessel in another mode of operation.

13. An apparatus as defined in claim 12, wherein the port is in communication with the volume between the container and the inside vessel for receiving a fluid in one mode of operation or providing a fluid in another mode of operation from or to the volume, respectively.

14. An apparatus as defined in claim 13, further comprising at least one additional port, wherein the additional port is in fluid communication with the inside vessel, the additional port being connected to another pressure control device for enabling the port for evacuating the inside vessel in one mode of operation and for providing fluids to the inside vessel in another mode of operation.

15. An apparatus as defined in claim 14, wherein the container and the inside vessel are integral.

16. An apparatus as defined in claim 12, wherein the filter is comprised substantially of glass fiber.

17. An apparatus as defined in claim 12, wherein the filter is disposed at approximately the bottom of the inside vessel.

18. An apparatus as defined in claim 12, wherein the inside vessel is removable from the container.

19. A method for performing a chemical or physical process within a microwave radiation field comprising the steps of:
    (a) placing a sample in an apparatus having a container and a second container therewithin, the container and the second container having a substantially closed volume therebetween, the container and the second container being in fluid communication with each other through a filter disposed at approximately the bottom of the second container for maintaining at least a portion of the sample;
    (b) sealing the apparatus;
    (c) heating the sample in the apparatus by applying microwave energy;
    (d) providing fluids to the volume or the second container through at least two inlet ports, the first inlet port in communication with the volume and the second inlet port in communication with the second container;
    (e) receiving fluids from the volume or the second container through at least two outlet ports, the first outlet port in communication with the volume and the second outlet port in communication with the second container.

20. A method for performing successively a plurality of physical or chemical processes in the same apparatus within a microwave cavity comprising the steps of:

a) placing a sample in the containing portion of a second container of an apparatus having a first container and the second container, the first container in fluid communication with the second container through a filter disposed within a fluid communication path therebetween for maintaining at least a portion of the sample from flowing between the first and the second containers;

b) sealing the apparatus;

c) heating the sample in the apparatus by applying microwave energy;

d) controlling the pressure inside at least one of the containers of the apparatus, whereby a pressure differential between the first container and the second container results in one of promoting and inhibiting fluid communication there between.

21. A method as defined in claim 20, wherein a filtration process is carried out by increasing the pressure differential between the first and the second container to induce fluids to pass from the second container to the first container.

* * * * *